(12) United States Patent
Wang et al.

(10) Patent No.: US 12,257,737 B2
(45) Date of Patent: Mar. 25, 2025

(54) ECOLOGICAL SLOPE ANTI-CORROSION TIMBER PILE, AND TREATMENT DEVICE AND TREATMENT METHOD THEREFOR

(71) Applicant: Harbin Normal University, Harbin (CN)

(72) Inventors: Hanxi Wang, Harbin (CN); Shuying Zang, Harbin (CN); Hongjun Zhang, Harbin (CN)

(73) Assignee: Harbin Normal University, Harbin (CN)

( * ) Notice: Subject to any disclaimer, the term of this patent is extended or adjusted under 35 U.S.C. 154(b) by 0 days.

(21) Appl. No.: 18/903,079

(22) Filed: Oct. 1, 2024

(65) Prior Publication Data

US 2025/0018596 A1 Jan. 16, 2025

Related U.S. Application Data

(63) Continuation of application No. PCT/CN2023/119299, filed on Sep. 18, 2023.

(30) Foreign Application Priority Data

Nov. 7, 2022 (CN) .......................... 202211385602.4

(51) Int. Cl.
*B27K 5/00* (2006.01)
*C10B 53/02* (2006.01)
(Continued)

(52) U.S. Cl.
CPC ............ *B27K 5/0085* (2013.01); *C10B 53/02* (2013.01); *F23G 5/0276* (2013.01); *F23G 5/38* (2013.01);
(Continued)

(58) Field of Classification Search
CPC ....... B27K 5/0085; F23G 5/0276; F23G 5/38; F23G 2201/303; F23G 2206/10; F23G 2209/261; C10B 53/02
(Continued)

(56) References Cited

U.S. PATENT DOCUMENTS 10,808,294 B2 * 10/2020 Abulnaga ............... F27B 3/045
2022/0003412 A1 * 1/2022 Hänel ..................... F23N 3/002

FOREIGN PATENT DOCUMENTS

CN 103361085 A 10/2013
CN 207193199 U 4/2018
(Continued)

*Primary Examiner* — Ko-Wei Lin
(74) *Attorney, Agent, or Firm* — IPRO, PLLC

(57) ABSTRACT

Provided are an ecological slope anti-corrosion timber pile and a treatment device and method therefor, belonging to the field of ecological engineering. The device includes a gasification furnace, and first, second and third carbonization chambers, each internally provided with a main gas pipeline, and multiple rows of radially distributed branch gas pipes are vertically disposed thereon and provided with electronic igniters. Multiple rows of radially distributed timber piles are vertically inside the carbonization chambers and between the branch gas pipes. The gasification furnace is connected to the main gas pipeline of the first carbonization chamber through a gas booster pump. The first carbonization chamber is connected to an air blower, the first and second carbonization chambers are connected through a joint pipe, the second and third carbonization chambers are connected through a pipeline, and the third carbonization chamber is connected to the gasification furnace through a gas delivery pipe.

18 Claims, 2 Drawing Sheets

(51) Int. Cl.
*F23G 5/027* (2006.01)
*F23G 5/38* (2006.01)

(52) U.S. Cl.
CPC .... *F23G 2201/303* (2013.01); *F23G 2206/10* (2013.01); *F23G 2209/261* (2013.01)

(58) Field of Classification Search
USPC .......................................................... 431/5
See application file for complete search history.

(56) References Cited

FOREIGN PATENT DOCUMENTS

| | | |
|---|---|---|
| CN | 111775252 A | 10/2020 |
| CN | 112923688 A | 6/2021 |
| CN | 114836242 A | 8/2022 |
| CN | 115648373 A | 1/2023 |
| JP | H06279776 A | 10/1994 |
| KR | 101162893 B1 | 7/2012 |

* cited by examiner

ECOLOGICAL SLOPE ANTI-CORROSION TIMBER PILE, AND TREATMENT DEVICE AND TREATMENT METHOD THEREFOR

TECHNICAL FIELD

The present disclosure belongs to the field of ecological engineering, and in particular relates to an ecological slope anti-corrosion timber pile, and a treatment device and a treatment method therefor.

BACKGROUND

Timber pile support is the main support form for urban river and lake slopes. Due to the long-term immersion of water on timber piles, coupled with soil and water pollution, the corrosion of timber piles is exacerbated. The conventional methods have one or several shortcomings, such as high cost, environmental pollution, reducing the strength of timber piles, long treatment cycle, and low efficiency. Therefore, it is very important to develop new timber pile anti-corrosion equipment to overcome the defects of the existing anti-corrosion methods.

At present, the construction of timber piles is severely corroded, and the use of asphalt and preservatives increases the risk of environmental pollution. In addition, improper treatment affects the strength of pile bodies. Therefore, it is of great significance to develop safe and reliable equipment for timber pile anti-corrosion treatment. Most of the existing timber pile anti-corrosion methods adopt the measures of adding external protection to timber piles or using the form of live timber piles to prolong the lifetime of timber piles. Although the protection effect of the measure of adding external protection to timber piles is good, the cost is high, and the construction difficulty is increased. The live timber piles can solve the problem of anti-corrosion, but the survival rate of timber piles is low, especially when they are buried deep in the soil or close to the water edge, which easily forms local decay and consequently lead to deactivation.

SUMMARY

In view of this, the present disclosure aims to propose an ecological slope anti-corrosion timber pile, and a treatment device and a treatment method therefor, so as to solve the problems in the prior art.

In order to achieve the above objective, the present disclosure adopts the following technical solution: a treatment device for an ecological slope anti-corrosion timber pile includes a gasification furnace and a carbonization chamber, where three carbonization chambers are provided and respectively a first carbonization chamber, a second carbonization chamber and a third carbonization chamber, each internally provided with a main gas pipeline; multiple rows of radially distributed branch gas pipes are disposed on the main gas pipeline along a vertical direction, and the branch gas pipes are provided with electronic igniters; multiple rows of radially distributed timber piles are disposed inside the carbonization chambers along a vertical direction, and the timber piles are located between the branch gas pipes; the gasification furnace is connected to the main gas pipeline of the first carbonization chamber by way of a gas booster pump; the first carbonization chamber is connected to an air blower, the first carbonization chamber is connected to the second carbonization chamber by way of a joint pipe, the second carbonization chamber is connected to the third carbonization chamber by way of a pipeline, and the third carbonization chamber is connected to the gasification furnace by way of a gas delivery pipe; and the timber piles are sequentially dried by the third carbonization chamber, thermally baked by the second carbonization chamber, and burned and carbonized by the first carbonization chamber.

Even further, the gasification furnace is a biomass gasification furnace.

Even further, the biomass gasification furnace includes a pyrolysis chamber and a biomass gasification chamber, where the pyrolysis chamber is internally provided with agricultural and forestry biomass waste and an electronic igniter, the pyrolysis chamber is connected to the biomass gasification chamber, and the biomass gasification chamber is connected to the first carbonization chamber.

Even further, a temperature measuring instrument is disposed inside the pyrolysis chamber.

Even further, the electronic igniter and the temperature measuring instrument are both battery-powered.

Even further, the biomass gasification furnace is connected to a pyrolysis control box.

Even further, the pyrolysis control box, the gas booster pump, and the air blower are all powered by an external power source.

Even further, the carbonization chambers are internally provided with vertical brackets, and the timber piles are disposed inside the carbonization chambers by way of the vertical brackets.

Even further, liquid collection boxes are disposed at bottoms of the carbonization chambers, and valves are disposed on the liquid collection boxes.

Even further, lengths of the timber piles are 1.5-8.0 m, diameters or side lengths thereof are 80-300 mm, and vertical spacing therebetween is 50-300 mm.

Even further, the timber piles are placed on a slope of 2-6 degrees, pile tips are higher than pile ends, and an inclination of the branch gas pipes is consistent with that of the timber piles. Even further, inner diameters of the main gas pipelines are 50-200 mm.

Even further, inner diameters of the branch gas pipes are 30-80 mm, lengths thereof are 100-300 mm, and vertical spacing therebetween is the same as that between the timber piles.

The present application also provides a treatment method of the treatment device for an ecological slope anti-corrosion timber pile, which includes the following steps:

step 1: starting the biomass gasification furnace to pyrolyze the agricultural and forestry biomass waste to generate biomass gas; enabling the biomass gas to enter the main gas pipeline of the first carbonization chamber by way of the gas booster pump, and distributing same to the branch gas pipes; and delivering air into the first carbonization chamber by way of the air blower;

step 2: igniting the biomass gas sprayed out from the branch gas pipes by using the electronic igniter in the first carbonization chamber, and carbonizing the timber piles;

step 3: enabling waste heat gas from the first carbonization chamber to enter the second carbonization chamber through a joint pipe, distributing the waste heat gas to the branch gas pipes through the main gas pipeline in the second carbonization chamber and blowing same towards the timber piles in the second carbonization chamber, and thermally baking the timber piles;

step 4: discharging waste heat gas from the second carbonization chamber into the main gas pipeline of the third carbonization chamber through a bottom pipeline port and then blowing same towards the timber piles in the third carbonization chamber through the branch gas pipes, and drying the timber piles; and step 5: enabling waste heat gas from the third carbonization chamber to flow back to the pyrolysis chamber of the gasification furnace through the bottom pipeline port.

Even further, after carbonization is completed in the first carbonization chamber, an air intake valve is closed, the first carbonization chamber is moved out, the second carbonization chamber is moved to an original position of the first carbonization chamber to replace the first carbonization chamber, the third carbonization chamber is moved to an original position of the second carbonization chamber to replace the second carbonization chamber, and a spare carbonization chamber is moved to an original position of the third carbonization chamber to replace the third carbonization chamber. After the first carbonization chamber is cooled for a certain period of time, the timber piles are taken out, and then new timber piles are loaded for later replacement of the third carbonization chamber.

Even further, the timber piles in the first carbonization chamber are taken out after cooling, and anti-corrosion paint is applied to pile tops of the timber piles and within a range of 0-0.5 m below the pile tops.

Even further, in step 3, the water and wood vinegar exuded during drying of the timber piles are collected with liquid collection boxes, and the water and wood vinegar in the liquid collection boxes are taken out after drying.

Even further, the timber piles in the first carbonization chamber are carbonized for 2-6 h.

Even further, after carbonization, the timber piles are cooled for 4-10 h and then taken out.

Even further, an air volume of the air blower matches a biomass gas combustion amount of the branch gas pipes in the first carbonization chamber, and a gas supply amount of the biomass gasification furnace matches a biomass gas amount of the first carbonization chamber.

Even further, a temperature in the biomass gasification furnace is controlled at 350-850° C.

Even further, the agricultural and forestry biomass waste is made of raw materials with particle sizes of less than 60 mm or lengths of less than 200 mm.

Compared with the prior art, the present disclosure has the beneficial effects that the present disclosure provides an ecological slope anti-corrosion timber pile, and a treatment device and a treatment method therefor, which prolongs the service life of the timber piles through anti-corrosion treatment, reduces the impact on the strength of pile bodies during a construction process, and improves the slope stability. The device is simple in process, low in cost of timber pile anti-corrosion treatment, less in energy consumption, and less in impact on the environment, thereby having higher promotion and application value.

The present disclosure adopts carbonization on the surface of the timber pile to form a 5-15 mm thick biochar layer on the surface of the timber pile so as to protect the pile body from corrosion. The anti-corrosion treatment method has little effect on the strength of the pile bodies and has low requirements on the technical level of timber pile construction machinery, which is safe and reliable. The developed anti-corrosion treatment device for the ecological slope timber piles is high in carbonization quality for the timber piles, avoids the pile bodies being damaged, and is high in energy utilization rate and low in carbonization treatment cost. The development of the device will have important practical significance to ensure the safety of the pile bodies, expand the scope of application of the timber piles, protect the slope safety, and the like.

The outer wall of the timber pile prepared by the present disclosure is carbonized at a thickness of 5-15 mm to prevent the timber pile from being corroded after being driven into the soil, while ensuring the strength of the timber pile. During the construction process of ecological slope support, it was found through tests that a 2-3 mm thick dense biochar powder film layer was formed on the surface of the pile, which effectively prevented water and pollutants from entering the timber pile and achieved a significant anti-corrosion effect.

The outer wall of the timber pile prepared by the present disclosure is carbonized at a thickness of 5-15 mm. The tests show that the carbonized layer has a shock absorption effect, effectively avoiding the damage to the pile body by the timber pile during vibratory pile driving construction, and the structural integrity of the pile body is increased from 89.3% of the non-carbonized timber pile to 100%. After on-site monitoring and calculation, it is found that the anti-overturning coefficient of the timber piles on the ecological slopes is increased by 0.1-0.3, and the anti-sliding safety coefficient of slope stability is increased by 0.2-0.5, which indicates that the stability of the ecological slopes is significantly improved.

The treatment device and method adopted in the present disclosure can realize the recycling of heat energy, with a thermal energy utilization rate being over 90%. The device adopts a step-by-step heat treatment method for the anti-corrosion treatment of timber piles, thereby being easy in quality control and achieving high quality; the device can fully collect the wood vinegar produced in the pyrolysis process of the timber piles, which reduces its pollution impact on the environment and realizes resource utilization; the treatment device has a large one-time processing capacity and a high degree of industrialization; and the treatment device makes full use of agricultural and forestry biomass waste, and consumes no energy except for a small amount of electricity, so that the cost is low.

BRIEF DESCRIPTION OF FIGURES

The accompanying drawings that constitute a part of the present disclosure are used to provide further understanding of the present disclosure. The illustrative embodiments of the present disclosure and the description thereof are used to explain the present disclosure, and do not constitute improper limitations to the present disclosure. In figures.

1 denotes a biomass gasification furnace, 2 denotes agricultural and forestry biomass waste, 3 denotes a pyrolysis chamber, 4 denotes a biomass gasification chamber, 5 denotes electronic igniters, 6 denotes a temperature measuring instrument, 7 denotes a pyrolysis control box, 8 denotes a first carbonization chamber, 9 denotes a second carbonization chamber, 10 denotes a third carbonization chamber, 11 denotes timber piles, 12 denotes vertical brackets, 13 denotes branch gas pipes, 14 denotes a gas booster pump, 15 denotes an air blower, 16 denotes liquid collection boxes, 17 denotes outer walls of carbonization chambers, 18 denotes main gas pipelines, 19 denotes a gas delivery pipe, 20 denotes valves, and 21 denotes a joint pipe.

DETAILED DESCRIPTION

The technical solutions in embodiments of the present disclosure will be clearly and completely described below in conjunction with the accompanying drawings in the embodiments of the present disclosure. It is to be understood that, in the case of no conflict, the embodiments and the features in the embodiments of the present disclosure can be combined with each other, and the described ones are merely a part of the embodiments of the present disclosure, rather than all of the embodiments.

Figure 1:
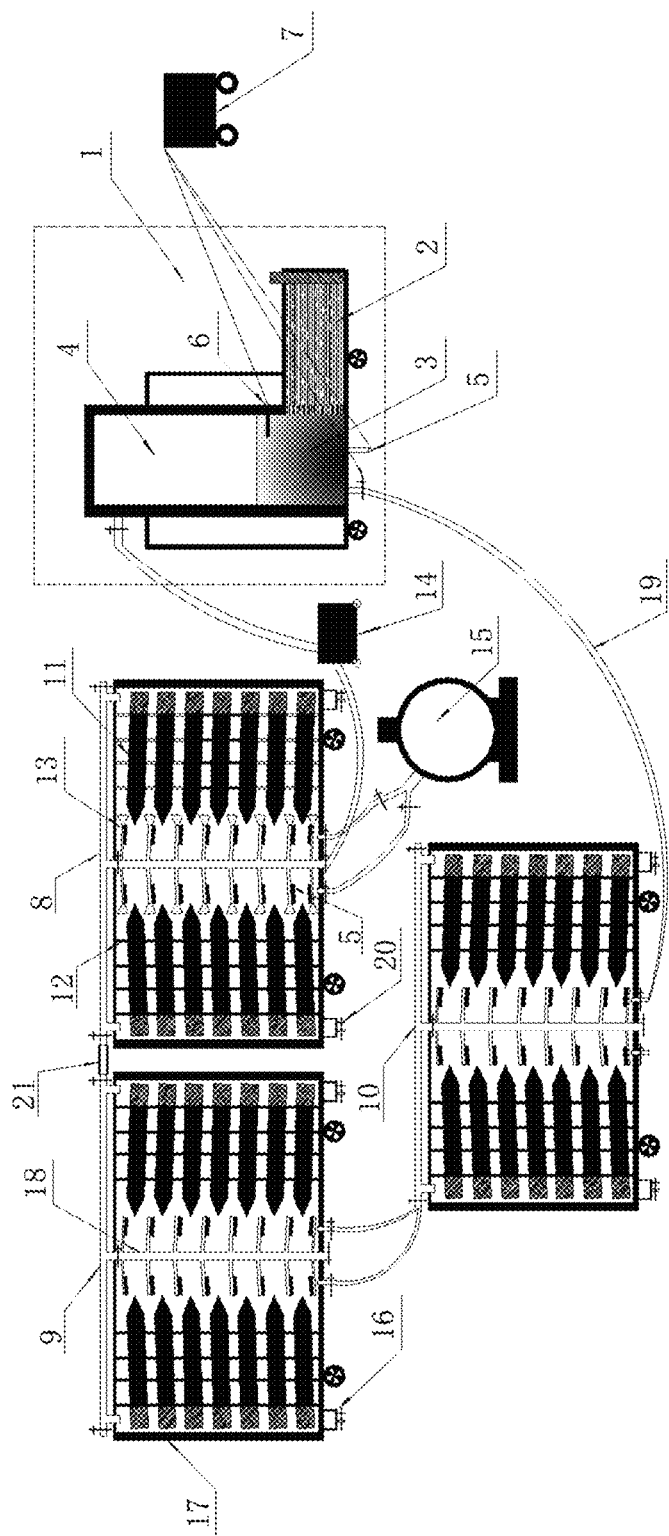
FIG. 1 is a schematic structural diagram of a treatment device for an ecological slope anti-corrosion timber pile according to the present disclosure.
Figure 2:
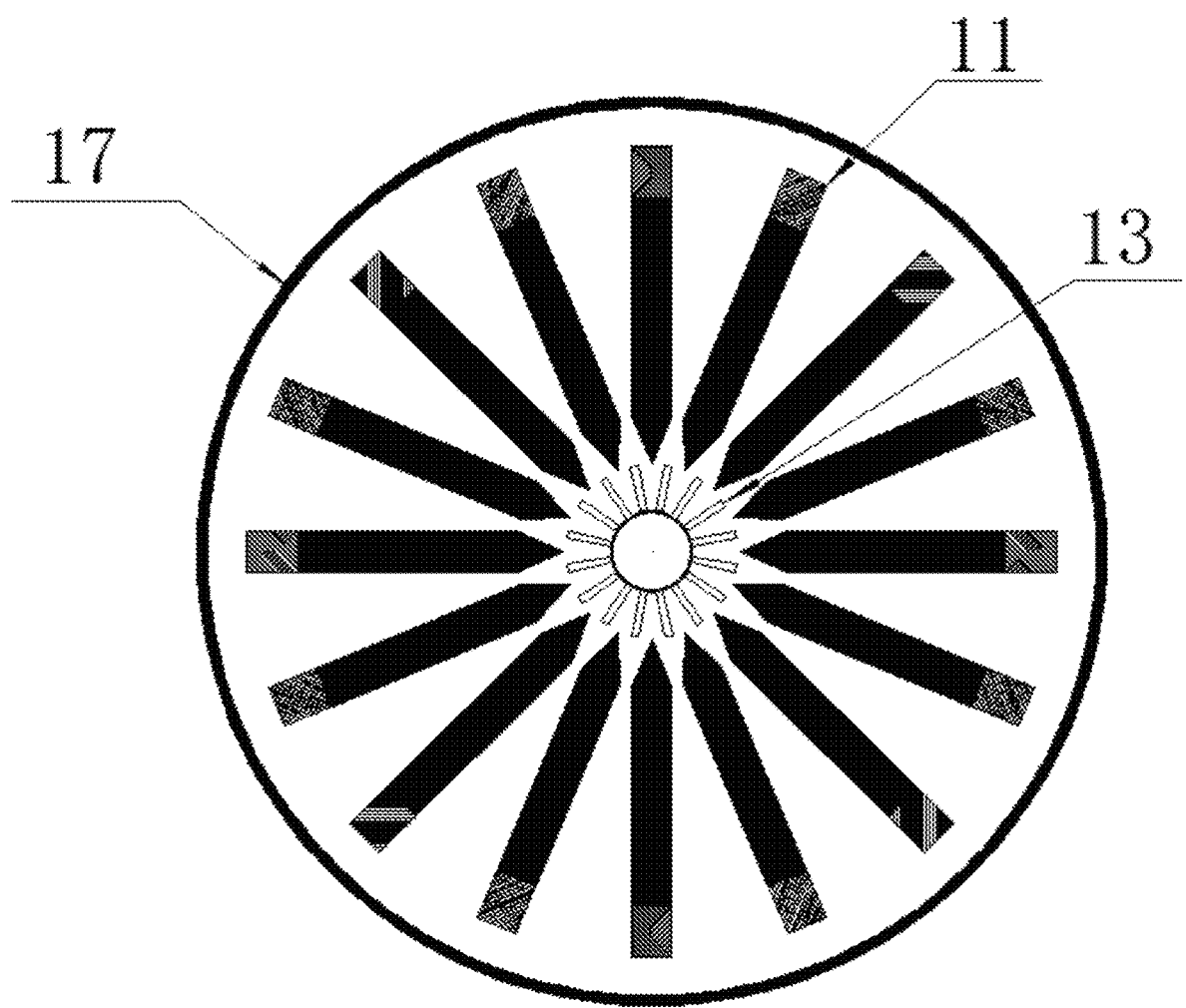
FIG. 2 is a schematic diagram of the top view structure of a carbonization chamber according to the present disclosure.

Referring to FIG. 1 and FIG. 2 to illustrate this embodiment, a treatment device for an ecological slope anticorrosion timber pile includes a gasification furnace and a carbonization chamber. Three carbonization chambers are provided and respectively a first carbonization chamber 8, a second carbonization chamber 9 and a third carbonization chamber 10, each internally provided with a main gas pipeline 18. Multiple rows of radially distributed branch gas pipes 13 are disposed on the main gas pipeline 18 along a vertical direction, and the branch gas pipes 13 are provided with electronic igniters 5. Multiple rows of radially distributed timber piles 11 are disposed inside the carbonization chambers along a vertical direction, and the timber piles 11 are located between the branch gas pipes 13. The gasification furnace is connected to the main gas pipeline 18 of the first carbonization chamber 8 by way of a gas booster pump 14. The first carbonization chamber 8 is connected to an air blower 15, the first carbonization chamber 8 is connected to the second carbonization chamber 9 by way of a joint pipe 21, the second carbonization chamber 9 is connected to the third carbonization chamber 10 by way of a pipeline, and the third carbonization chamber 10 is connected to the gasification furnace by way of a gas delivery pipe 19. The timber piles 11 are sequentially dried by the third carbonization chamber 10, thermally baked by the second carbonization chamber 9, and burned and carbonized by the first carbonization chamber 8.

The gasification furnace is a biomass gasification furnace 1, which produces biomass gas by pyrolyzing biomass materials, and the biomass gas is used as fuel for combustion and carbonization in the first carbonization chamber 8. The biomass gasification furnace 1 includes a pyrolysis chamber 3 and a biomass gasification chamber 4. The pyrolysis chamber 3 is internally provided with agricultural and forestry biomass waste 2 and an electronic igniter 5, the pyrolysis chamber 3 is connected to the biomass gasification chamber 4, the biomass gasification chamber 4 is connected to the first carbonization chamber 8, a temperature measuring instrument 6 is disposed inside the pyrolysis chamber 3, and the biomass gasification furnace 1 is connected to a pyrolysis control box 7. The pyrolysis temperature of the agricultural and forestry biomass waste 2 in the biomass gasification furnace 1 is observed through the pyrolysis control box 7, and the ignition of the electronic igniter 5 and the control of an amount of gas entering the pyrolysis chamber 3 are performed.

The electronic igniter 5 and the temperature measuring instrument 6 are both battery-powered. The pyrolysis control box 7, the gas booster pump 14, and the air blower 15 are all powered by an external power source. The carbonization chambers are internally provided with vertical brackets 12, and the timber piles 11 are disposed inside the carbonization chambers by way of the vertical brackets 12.

Liquid collection boxes 16 are disposed at bottoms of the carbonization chambers, and valves 20 are disposed on the liquid collection boxes 16. The water and wood vinegar exuded from the timber piles 11 are collected with the liquid collection boxes 16.

Lengths of the timber piles 11 are 1.5-8.0 m, diameters or side lengths thereof are 80-300 mm, and vertical spacing therebetween is 50-300 mm. The timber piles 11 are placed on a slope of 2-6 degrees, pile tips are higher than pile ends, and an inclination of the branch gas pipes 13 is consistent with that of the timber piles 11. Inner diameters of the main gas pipelines 18 are 50-200 mm. Inner diameters of the branch gas pipes 13 are 30-80 mm, lengths thereof are 100-300 mm, and vertical spacing therebetween is the same as that between the timber piles 11.

In this embodiment, a treatment method of the treatment device for an ecological slope anti-corrosion timber pile includes the following steps:

step 1: starting the biomass gasification furnace 1 to pyrolyze the agricultural and forestry biomass waste 2 to generate biomass gas; enabling the biomass gas generated by pyrolysis to enter the main gas pipeline 18 of the first carbonization chamber 8 by way of the gas booster pump 14, and distributing same to the branch gas pipes 13; controlling the flow rate of the gas entering the first carbonization chamber 8 by using the gas booster pump 14, and delivering air into the first carbonization chamber 8 by way of the air blower 15 for oxygen supply;

step 2: igniting the biomass gas sprayed out from the branch gas pipes 13 by using the electronic igniter 5 in the first carbonization chamber 8, and carbonizing the timber piles 11;

step 3: enabling waste heat gas from the first carbonization chamber 8 to enter the second carbonization chamber 9 through a joint pipe 21, opening the valve, distributing the waste heat gas to the branch gas pipes 13 through the main gas pipeline 18 in the second carbonization chamber 9 and blowing same towards the timber piles 11 in the second carbonization chamber 9, and thermally baking the timber piles 11; collecting water and wood vinegar exuded during drying of the timber piles 11 with the liquid collection boxes 16; and after drying, taking out the water and wood vinegar in the liquid collection box 16;

step 4: discharging waste heat gas from the second carbonization chamber 9 into the main gas pipeline 18 of the third carbonization chamber 10 through a bottom pipeline port and then blowing same towards the timber piles 11 in the third carbonization chamber 10 through the branch gas pipes 13, and drying the timber piles 11; and step 5: enabling waste heat gas from the third carbonization chamber 10 to flow back to the pyrolysis chamber 3 of the gasification furnace through the bottom pipeline port.

After carbonization is completed in the first carbonization chamber 8, an air intake valve is closed, the first carbonization chamber 8 is moved out, the second carbonization chamber 9 is moved to an original position of the first carbonization chamber 8 to replace the first carbonization chamber 8, the third carbonization chamber 10 is moved to an original position of the second carbonization chamber 9 to replace the second carbonization chamber 9, and a spare carbonization chamber is moved to an original position of the third carbonization chamber 10 to replace the third carbonization chamber 10. After the first carbonization chamber 8 is cooled for a certain period of time, the timber piles 11 are taken out, and then new timber piles 11 are loaded for later replacement of the third carbonization chamber 10.

The timber piles 11 in the first carbonization chamber 8 are taken out after cooling, and anti-corrosion paint is applied to pile tops of the timber piles 11 and within a range of 0-0.5 m below the pile tops. The timber piles 11 in the first carbonization chamber 8 are carbonized for 2-6 h. After the carbonization is completed, the timber piles 11 are taken out after being cooled for 4-10 h.

An air volume of the air blower 15 matches a biomass gas combustion amount of the branch gas pipes 13 in the first carbonization chamber 8, and a gas supply amount of the biomass gasification furnace 1 matches a biomass gas amount of the first carbonization chamber 8. A temperature in the biomass gasification furnace 1 is controlled at 350-850° C. The agricultural and forestry biomass waste 2 is made of raw materials with particle sizes of less than 60 mm or lengths of less than 200 mm.

Embodiment: Anti-Corrosion Treatment of Timber Piles on Lake Slopes in Urban Parks Referring to FIG. 1 and FIG. 2, a treatment device is composed of a biomass gasification furnace 1 and three carbonization chambers. The biomass gasification furnace 1 is connected to the first carbonization chamber 8 by way of a gas booster pump 14. The first carbonization chamber 8 is connected to the second carbonization chamber 9 by way of a joint pipe 21, the second carbonization chamber 9 is connected to the third carbonization chamber 10 by way of a pipeline, and the gas discharged from the third carbonization chamber 10 is introduced into the biomass gasification furnace 1 by way of a gas delivery pipe 19. The first carbonization chamber 8 is connected to an air blower 15, and the biomass gasification furnace 1 is connected to a pyrolysis control box 7. Timber piles 11 are distributed in the three carbonization chambers, and the timber piles 11 are fixed by vertical brackets 12 in the carbonization chambers. The biomass gasification furnace 1 includes a pyrolysis chamber 3, a biomass gasification chamber 4, an electronic igniter 5 and a temperature measuring instrument 6. The pyrolysis temperature of agricultural and forestry biomass waste 2 in the biomass gasification furnace 1 is observed through the pyrolysis control box 7, and the ignition of the electronic igniter 5 and the control of an amount of gas entering the pyrolysis chamber 3 are performed. The timber piles 11 are sequentially dried by the third carbonization chamber 10, thermally baked by the second carbonization chamber 9, and burned and carbonized by the first carbonization chamber 8.

An amount of the biomass gas generated by pyrolysis entering the first carbonization chamber 8 is controlled by way of the gas booster pump 14, air is delivered into the first carbonization chamber 8 by way of the air blower 15 for oxygen supply, and the timber piles 11 are carbonized by burning the biomass gas of the branch gas pipes 13 ignited by the electronic igniter 5. Waste heat gas from the first carbonization chamber 8 enters the second carbonization chamber 9 through the joint pipe 21, a valve is opened, and the waste heat gas is distributed to the branch gas pipes 13 through the main gas pipeline 18 and blown towards the timber piles 11 in the second carbonization chamber 9. The water and wood vinegar exuded from the timber piles 11 are collected with liquid collection boxes 16. Waste heat gas from the second carbonization chamber 9 is discharged into the third carbonization chamber 10 through a bottom pipeline port, and then blown towards the timber piles 11 through the branch gas pipes 13 in the third carbonization chamber 10. Waste heat gas from the third carbonization chamber 10 flows back to the pyrolysis chamber 3 through the bottom pipeline port.

After carbonization is carried out for 2 h in the first carbonization chamber 8, an air intake valve is closed, and the second carbonization chamber 9 is moved to the position of the first carbonization chamber 8 to replace the original first carbonization chamber 8 at the same time. The third carbonization chamber 10 is moved to the position of the second carbonization chamber 9 to replace the original second carbonization chamber 9, and the water and wood vinegar in the liquid collection boxes 16 in the second carbonization chamber 9 and the third carbonization chamber 10 are taken out at the same time. A spare carbonization chamber is moved to the position of the third carbonization chamber 10 to original replace the third carbonization chamber 10. After the first carbonization chamber 8 is cooled for 4 h, the timber piles 11 are taken out, and then new timber piles 11 are loaded for the replacement of the third carbonization chamber 10 in the next step.

An air volume of the air blower 15 is 15-25 m$^3$/min, and 10 layers of timber piles are placed in each of the three carbonization chambers. The gas production of the biomass gasification furnace 1 is 4.5-8.5 m$^3$/min. Lengths of the timber piles 11 are 3.0 m, diameters thereof are 100 mm, and vertical spacing therebetween is 50 mm. Inner diameters of the main gas pipelines 18 are 50 mm. Inner diameters of the branch gas pipes 13 are 30 mm, lengths thereof are 100 mm, and vertical spacing therebetween is the same as that between the timber piles 11. The branch gas pipes 13 are radially and evenly distributed along the horizontal plane of the main pipeline 18. A temperature in the biomass gasification furnace 1 is controlled at 350-450° C., and a length of corn straw as a raw material for the agricultural and forestry biomass waste 2 is less than 100 mm. The timber piles 11 in the three carbonization chambers are placed obliquely on a slope of 2 degrees, pile tips are higher than pile ends, and an inclination of the branch gas pipes 13 is consistent with that of the timber piles 11. The electronic igniter 5 and the temperature measuring instrument 6 are both battery-powered, and the pyrolysis control box 7, the gas booster pump 14, and the air blower 15 are all powered by an external power source. The timber piles 11 in the first carbonization chamber 8 are taken out after cooling, and anti-corrosion paint is applied to pile tops and within a range of 0-0.2 m below the pile tops. According to the above method, 3219 piles are carbonized in turn.

The slope heights are 5.2-6.6 m, and the slope gradient (height: horizontal distance) is 1:1.65. It was found through tests that a 2-3 mm thick dense biochar powder film layer was formed on the surface of the pile, which effectively prevented water and pollutants from entering the timber pile and achieved a significant anti-corrosion effect. The outer wall of the prepared timber pile is carbonized at a thickness of 5-15 mm, and the carbonized layer has a shock absorption effect, which enables the structural integrity of the constructed pile body to reach 100%. After on-site monitoring and calculation, it is found that the anti-overturning coefficient of the timber piles on the ecological slopes is increased by 0.10-0.25, and the anti-sliding safety coefficient of slope stability is increased by 0.20-0.32, which indicates that the stability of the ecological slopes is improved.

Embodiment: Anti-Corrosion Treatment of Timber Piles on River Slopes in Urban Parks Referring to FIG. 1 and FIG. 2, a treatment device is composed of a biomass gasification furnace 1 and three carbonization chambers. Timber piles 11 are sequentially dried by the third carbonization chamber 10, thermally baked by the second carbonization chamber 9, and burned and carbonized by the first carbonization chamber 8. The pyrolysis temperature in the biomass gasification furnace 1 is observed through the pyrolysis control box 7, and the ignition of an electronic igniter 5 and the control of an amount of gas entering a pyrolysis chamber 3 are performed by the biomass gasification furnace 1. An amount of the biomass gas generated by pyrolysis entering the first carbonization chamber 8 is controlled by way of the gas booster pump 14, air is delivered into the first carbonization chamber 8 by way of an air blower 15 for oxygen supply, and the timber piles 11 are carbonized by burning the biomass gas of the branch gas pipes 13 ignited by the electronic igniter 5. Waste heat gas from the first carbonization chamber 8 enters the second carbonization chamber 9 through a joint pipe 21, a valve is opened, and the waste heat gas is distributed to the branch gas pipes 13 through the main gas pipeline 18 and blown towards the timber piles 11 in the second carbonization chamber 9. The water and wood vinegar exuded from the timber piles 11 are collected with liquid collection boxes 16. Waste heat gas from the second carbonization chamber 9 is discharged into the third carbonization chamber 10 through a bottom pipeline port, and then blown towards the timber piles 11 through the branch gas pipes 13 in the third carbonization chamber 10. Waste heat gas from the third carbonization chamber 10 flows back to the pyrolysis chamber 3 through the bottom pipeline port.

After carbonization is carried out for 4 h in the first carbonization chamber 8, an air intake valve is closed, and the second carbonization chamber 9 is moved to the position of the first carbonization chamber 8 to replace the original first carbonization chamber 8 at the same time. The third carbonization chamber 10 is moved to the position of the second carbonization chamber 9 to replace the original second carbonization chamber 9, and the water and wood vinegar in the liquid collection boxes 16 in the second carbonization chamber 9 and the third carbonization chamber 10 are taken out at the same time. A spare carbonization chamber is moved to the position of the third carbonization chamber 10 to replace the original third carbonization chamber 10. After the first carbonization chamber 8 is cooled for 5 h, the timber piles 11 are taken out, and then new timber piles 11 are loaded for the replacement of the third carbonization chamber 10 in the next step.

An air volume of the air blower 15 is 20-35 m$^3$/min, and 12 layers of timber piles are placed in each of the three carbonization chambers. The gas production of the biomass gasification furnace 1 is 5.5-9.5 m$^3$/min. Lengths of the timber piles 11 are 5.0 m, diameters thereof are 200 mm, and vertical spacing therebetween is 100 mm. Inner diameters of the main gas pipelines 18 are 100 mm. Inner diameters of the branch gas pipes 13 are 60 mm, lengths thereof are 150 mm, and vertical spacing therebetween is the same as that between the timber piles 11. The branch gas pipes 13 are radially and evenly distributed along the horizontal plane of the main pipeline 18. A temperature in the biomass gasification furnace 1 is controlled at 450-550° C., and lengths of branches and leaves as raw materials for the agricultural and forestry biomass waste 2 are less than 200 mm. The timber piles 11 in the three carbonization chambers are placed obliquely on a slope of 5 degrees, pile tips are higher than pile ends, and an inclination of the branch gas pipes 13 is consistent with that of the timber piles 11. The timber piles 11 in the first carbonization chamber 8 are taken out after cooling, and anti-corrosion paint is applied to pile tops and within a range of 0-0.3 m below the pile tops. According to the above method, 2650 piles are carbonized in turn.

The slope heights are 6.5-8.2 m, and the slope gradient (height: horizontal distance) is 1:1.19. It was found through tests that a 2-3 mm thick dense biochar powder film layer was formed on the surface of the pile, achieving a significant anti-corrosion effect. The outer wall of the prepared timber pile is carbonized at a thickness of 5-15 mm, which enables the structural integrity of the constructed pile body to reach 100%. After on-site monitoring and calculation, it is found that the anti-overturning coefficient of the timber piles on the ecological slopes is increased by 0.12-0.26, and the anti-sliding safety coefficient of slope stability is increased by 0.31-0.42, which indicates that the stability of the ecological slopes is significantly improved.

Embodiment: Anti-Corrosion of Timber Piles on Slopes of Urban Rivers and Lakes

Referring to FIG. 1 and FIG. 2, a treatment device is composed of a biomass gasification furnace 1 and three carbonization chambers. Timber piles 11 are sequentially dried by the third carbonization chamber 10, thermally baked by the second carbonization chamber 9, and burned and carbonized by the first carbonization chamber 8. The biomass gasification furnace 1 is connected to the first carbonization chamber 8 by way of a gas booster pump 14. The biomass gasification furnace 1 includes a pyrolysis chamber 3, a biomass gasification chamber 4, an electronic igniter 5 and a temperature measuring instrument 6. The pyrolysis temperature of agricultural and forestry biomass waste 2 in the biomass gasification furnace 1 is observed through a pyrolysis control box 7, and the ignition of the electronic igniter 5 and the control of an amount of gas entering the pyrolysis chamber 3 are performed. An amount of the biomass gas generated by pyrolysis entering the first carbonization chamber 8 is controlled by way of the gas booster pump 14, air is delivered into the first carbonization chamber 8 by way of an air blower 15 for oxygen supply, and the timber piles 11 are carbonized by burning the biomass gas of the branch gas pipes 13 ignited by the electronic igniter 5. Waste heat gas from the first carbonization chamber 8 enters the second carbonization chamber 9 through a joint pipe 21, a valve is opened, and the waste heat gas is distributed to the branch gas pipes 13 through the main gas pipeline 18 and blown towards the timber piles 11 in the second carbonization chamber 9. The water and wood vinegar exuded from the timber piles 11 are collected with liquid collection boxes 16. Waste heat gas from the second carbonization chamber 9 is discharged into the third carbonization chamber 10 through a bottom pipeline port, and then blown towards the timber piles 11 through the branch gas pipes 13 in the third carbonization chamber 10. Waste heat gas from the third carbonization chamber 10 flows back to the pyrolysis chamber 3 through the bottom pipeline port.

After carbonization is carried out for 6 h in the first carbonization chamber 8, an air intake valve is closed, and the second carbonization chamber 9 is moved to the position of the first carbonization chamber 8 to replace the original first carbonization chamber 8 at the same time. The third carbonization chamber 10 is moved to the position of the second carbonization chamber 9 to replace the original second carbonization chamber 9, and the water and wood vinegar in the liquid collection boxes 16 in the second carbonization chamber 9 and the third carbonization chamber 10 are taken out at the same time. A spare carbonization chamber is moved to the position of the third carbonization chamber 10 to replace the original third carbonization chamber 10. After the first carbonization chamber 8 is cooled for 10 h, the timber piles 11 are taken out, and then new timber piles 11 are loaded for the replacement of the third carbonization chamber 10 in the next step.

An air volume of the air blower 15 is 45-60 m³/min, and 15 layers of timber piles are placed in each of the three carbonization chambers. The gas production of the biomass gasification furnace 1 is 9.0-15.0 m³/min. By adjusting an air volume of the air blower 15 and an amount of biomass gas supply, the biomass gas in the branch gas pipes 13 in the first carbonization chamber 8 is fully burned. Lengths of the timber piles 11 are 8.0 m, the side lengths thereof are 300 mm, and vertical spacing therebetween is 300 mm. Inner diameters of the main gas pipelines 18 are 200 mm. Inner diameters of the branch gas pipes 13 are 80 mm, lengths thereof are 300 mm, and vertical spacing therebetween is 300 mm. The branch gas pipes 13 are radially and evenly distributed along the horizontal plane of the main pipeline 18. A temperature in the biomass gasification furnace 1 is controlled at 550-850° C., and the raw materials of the agricultural and forestry biomass waste 2 are less than 60 mm in particle sizes. The timber piles 11 in the three carbonization chambers are placed obliquely on a slope of 10 degrees, pile tips are higher than pile ends, and an inclination of the branch gas pipes 13 is consistent with that of the timber piles 11. The electronic igniter 5 and the temperature measuring instrument 6 are both battery-powered, and the pyrolysis control box 7, the gas booster pump 14, and the air blower 15 are all powered by an external power source. The timber piles 11 in the first carbonization chamber 8 are taken out after cooling, and anti-corrosion paint is applied to pile tops and within a range of 0-0.5 m below the pile tops. According to the above method, 5638 piles are carbonized in turn.

The slope heights are 7.9-9.3 m, and the slope gradient (height: horizontal distance) is 1:1.15. It was found through tests that a 2-3 mm thick dense biochar powder film layer was formed on the surface of the pile, achieving a significant anti-corrosion effect. The outer wall of the prepared timber pile is carbonized at a thickness of 5-15 mm, which enables the structural integrity of the pile body to reach 100%. After on-site monitoring and calculation, it is found that the anti-overturning coefficient of the timber piles on the ecological slopes is increased by 0.18-0.30, and the anti-sliding safety coefficient of slope stability is increased by 0.33-0.50, which indicates that the stability of the ecological slopes is significantly improved.

The above disclosed embodiments of the present disclosure are merely intended to assist in illustrating the present disclosure. The embodiments do not provide a detailed description of all the details, nor do they limit the present disclosure to the specific embodiments described. Many modifications and variations are possible in light of the contents of this Description. These embodiments are selected and specifically described in this Description for the purpose of better explaining the principles and practical applications of the present disclosure, so that those skilled in the art can well understand and utilize the present disclosure.

What is claimed is:

1. A treatment device, comprising
a gasification furnace, and
three carbonization chambers (a first carbonization chamber, a second carbonization chamber and a third carbonization chamber);
wherein each of the first carbonization chamber, the second carbonization chamber and the third carbonization chamber comprises:
a main gas pipeline in an interior thereof,
branch gas pipes disposed on the main gas pipeline along a vertical direction, and the branch gas pipes comprising-electronic igniters,
wherein each of the first carbonization chamber, the second carbonization chamber and the third carbonization chamber is configured to receive timber piles in the interior along a vertical direction between the branch gas pipes;
wherein the gasification furnace is connected to the main gas pipeline of the first carbonization chamber by a gas booster pump; the first carbonization chamber is connected to an air blower; the first carbonization chamber is connected to the second carbonization chamber by a joint pipe; the second carbonization chamber is connected to the third carbonization chamber by a pipeline; and the third carbonization chamber is connected to the gasification furnace by a gas delivery pipe;
wherein the third carbonization chamber is configured to dry the timber piles, the second carbonization chamber is configured to thermally bake the timber piles, and the first carbonization chamber is configured to burn and carbonize the timber piles.

2. The treatment device according to claim 1, wherein the gasification furnace is a biomass gasification furnace.

3. The treatment device according to claim 2, wherein the biomass gasification furnace comprises a pyrolysis chamber and a biomass gasification chamber, the pyrolysis chamber is configured to receive biomass waste and comprises an electronic igniter, the pyrolysis chamber is connected to the biomass gasification chamber, and the biomass gasification chamber is connected to the first carbonization chamber.

4. The treatment device according to claim 3, comprising a temperature measuring instrument inside the pyrolysis chamber.

5. The treatment device according to claim 4, wherein the electronic igniter and the temperature measuring instrument are both battery-powered.

6. The treatment device according to claim 3, wherein the biomass gasification furnace is connected to a pyrolysis control box.

7. The treatment device according to claim 6, wherein the pyrolysis control box, the gas booster pump, and the air blower are powered by an external power source.

8. The treatment device according to claim 1, wherein each of the first carbonization chamber, the second carbonization chamber and the third carbonization chamber comprises vertical brackets in the interior, and the vertical brackets are configured to receive the timber piles.

9. The treatment device according to claim 1, comprising liquid collection boxes at a bottoms of each of the first carbonization chamber, the second carbonization chamber and the third carbonization chamber, and the liquid collection boxes comprise valves.

10. The treatment device according to claim 1, wherein lengths of the timber piles are 1.5-8.0 meters, diameters or side lengths of the timber piles are 80-300 mm, and vertical spacing among of the timber piles is 50-300 mm.

11. The treatment device according to claim 1, wherein the timber piles are placed on a slope of 2-6 degrees, pile tips are higher than pile ends, and an inclination of the branch gas pipes is consistent with that of the timber piles.

12. The treatment device according to claim 1, wherein an inner diameter of the main gas pipeline is 50-200 mm.

13. The treatment device according to claim 1, wherein inner diameters of the branch gas pipes are 30-80 mm, lengths of the branch gas pipes are 100-300 mm, and vertical space between adjacent branch gas pipes is the same as that between adjacent timber piles.

14. A method of using the treatment device of claim 3, comprising:
- step 1: causing a biomass gas to enter the main gas pipeline of the first carbonization chamber using the gas booster pump, and distributing the biomass gas to the branch gas pipes; and delivering air into the first carbonization chamber using the air blower;
- step 2: igniting the biomass gas in the first carbonization chamber, thereby carbonizing the timber piles;
- step 3: causing waste heat gas from the first carbonization chamber to enter the second carbonization chamber through the joint pipe, distributing the waste heat gas to the branch gas pipes of the second carbonization chamber through the main gas pipeline of the second carbonization chamber and blowing the waste heat gas towards the timber piles in the second carbonization chamber, thereby thermally baking the timber piles;
- step 4: discharging the waste heat gas from the second carbonization chamber into the main gas pipeline of the third carbonization chamber through a bottom pipeline port and then blowing the waste heat gas towards the timber piles in the third carbonization chamber through the branch gas pipes of the third carbonization chamber, thereby drying the timber piles; and
- step 5: causing the waste heat gas to flow from the third carbonization chamber back to the gasification furnace;
- step 6: after carbonization is completed in the first carbonization chamber, removing the first carbonization chamber, moving the second carbonization chamber to an original position of the first carbonization chamber to replace the first carbonization chamber, moving the third carbonization chamber to an original position of the second carbonization chamber to replace the second carbonization chamber.

15. The method according to claim 14, further comprising applying an anti-corrosion paint is to pile tops of the timber piles and within a range of 0-0.5 meter below the pile tops.

16. The method according to claim 14, wherein step 3 further comprises collecting water and wood vinegar exuded during drying of the timber piles.

17. The method according to claim 14, wherein step 2 further comprises carbonizing the timber piles in the first carbonization chamber for 2-6 hours.

18. The method according to claim 14, further comprising, after carbonization, cooling the timber piles for 4-10 hours.

* * * * *